United States Patent [19]

Westfall et al.

[11] E Patent Number: Re. 33,184

[45] Reissued Date of Patent: Mar. 20, 1990

[54] POWER CONTROLLER CIRCUIT WITH AUTOMATIC CORRECTION FOR PHASE LAG BETWEEN VOLTAGE AND CURRENT

[75] Inventors: Raymond T. Westfall, Seminole; John F. Kohls, Pinellas, both of Fla.

[73] Assignee: Industrial Power Controls, Inc., North Redington Beach, Fla.

[21] Appl. No.: 149,441

[22] Filed: Jan. 28, 1988

Related U.S. Patent Documents

Reissue of:

[64] Patent No.: 4,672,301
Issued: Jun. 9, 1987
Appl. No.: 848,058
Filed: Apr. 4, 1986

[51] Int. Cl.[4] ..... G05F 1/455

[52] U.S. Cl. ..... 323/243; 323/235; 323/319; 323/326

[58] Field of Search ..... 363/235, 239, 242, 243, 363/319, 324, 325, 326, 901

[56] References Cited

U.S. PATENT DOCUMENTS

| | | | |
|---|---|---|---|
| 3,818,320 | 6/1974 | Schindler | 323/242 |
| 4,047,097 | 9/1977 | Gyugi et al. | 323/235 |
| 4,072,880 | 2/1978 | Oshima et al. | 323/321 |
| 4,223,207 | 9/1980 | Chow | 323/244 |
| 4,308,494 | 12/1981 | Gelfand et al. | 323/242 |
| 4,328,459 | 5/1982 | McLeod, Jr. | 323/321 |
| 4,337,430 | 6/1982 | Flego | 323/325 |
| 4,453,123 | 6/1984 | Erkmann | 323/324 |
| 4,463,269 | 7/1984 | Yashima | 323/326 |
| 4,490,771 | 12/1984 | Huber et al. | 323/242 |
| 4,504,778 | 3/1985 | Evans | 323/323 |

FOREIGN PATENT DOCUMENTS

| | | | |
|---|---|---|---|
| 52-68948 | 6/1977 | Japan | 323/244 |
| 2127238 | 4/1984 | United Kingdom | 323/319 |

*Primary Examiner*—Patrick R. Salce
*Assistant Examiner*—Judson H. Jones
*Attorney, Agent, or Firm*—Edwin E. Greigg

[57] ABSTRACT

What is proposed is an electronic circuit for controlling the amount of AC power delivered to an inductive or resistive load which continuously measures the actual phase lag between the load current and applied voltage and automatically adjusts the firing angle to provide the desired amount of AC power. The circuit includes an auxiliary on/off input with soft start and independently adjustable time delays for the on and off functions and also incorporates an input for remote power level control and features a half-wave rectified mode which delivers pulsating DC power to the load.

10 Claims, 9 Drawing Sheets

POWER CONTROLLER CIRCUIT WITH AUTOMATIC CORRECTION FOR PHASE LAG BETWEEN VOLTAGE AND CURRENT

Matter enclosed in heavy brackets [ ] appears in the original patent but forms no part of this reissue specification; matter printed in italics indicates the additions made by reissue.

BACKGROUND OF THE INVENTION

This invention relates to an electronic circuit for controlling the amount of AC electrical power delivered to an inductive or resistive load.

Many different circuits have been developed to control the AC power delivered to inductive and resistive loads. Most of them use thyristor type semiconductor devices like (SCRs) and (TRIACs) which being conducting when a suitable trigger pulse is applied and continue conducting as long as sufficient current flows through them. Some of them use an analog-type semiconductor device like (MOSFETs) and (DARLINGTON TRANSISTORs) which require a continuous trigger signal to maintain conduction. Both thyristor and transistor type devices have advantages and disadvantages within this context.

The present invention proposes to overcome the aforementioned prior art limitations by including a full range of features such as, for example, dynamically measuring the phase lag in real time and automatically correcting for it, soft start, auxiliary on/off, independently adjustable time delays for the on and off functions, (0–10 volt) and (4–20 ma) input for remote power level control, and a half-wave rectification mode. Thus, the usefulness afforded by this invention is that it provides a circuit that is completely compatible with both thyristor and transistor-type devices. This allows the circuit according to the invention to be used in a wide variety of applications by simply choosing the best switching device for each case. Thus, the circuit according to the invention may be applied to control any load, regardless of the inductive properties of the load, without adjustment or modification.

The inductive property of many loads such as motors, transformers, and coils causes the current in these devices to lag behind the applied voltage. This condition is called phase lag and the magnitude of this lag is a function of the inductance of the load as well as the amount of current flowing through the load. When semiconductor devices are used to control the amount of power delivered to the load, the timing of the trigger signals must be adjusted to compensate for the phase lag. Several circuits exist, a current transformer-type system or a load sensing resistor type system, which make these kinds of adjustments with suitable modifications, but none of these circuits can automatically correct for phase lag for any load, regardless of the inductive properties of the load.

OBJECT AND SUMMARY OF THE INVENTION

Accordingly, it is an object of the present invention to include a load current zero crossing detector in the form of a set of cross connected diodes and a voltage comparator. All the load current is caused to flow through the diodes and the voltage developed across the diodes is limited to (+/−) their forward threshold voltage, which thus provides an accurate measurement of the zero crossing independent of the load current. As a consequence very little power is used, and the components need not be optimized for different load currents.

Another object of the present invention is to provide a phase angle detector which produces a fixed amplitude pulse whose width is exactly equal, in real time, to the phase lag between the voltage and load current.

Another object of the present invention is to provide a system of firing and retarding ramp generators which determine the timing of trigger pulses for the switching devices, that is, the combination of one ramp which establishes the firing time and a second ramp which retards it according to the phase lag between the voltage and the current in the load. This combination provides full smooth control from zero to maximum power with no dead band in the reference potentiometer or signal regardless of the inductance of the load. The power delivered to the load always varies in a linear fashion with the level control.

Another object of the present invention is to provide a power level control circuit which combines the signals from the firing and retarding ramp generators and the level control input in order to initiate trigger pulses with the proper timing to provide the desired amount of power. When an AC voltage is applied to an inductive load the current through the load lags, in phase, behind the voltage applied to it. If semiconductor components are used to control the AC power delivered to the load certain corrections must be made to compensate for the phase lag in the current. Semiconductor devices like (TRIACS) and (SCRs) can be triggered into conduction by an appropriate pulse but the pulse must be maintained until sufficient current flows through the device to sustain it in the conduction mode. When the current falls below this threshold value the device turns off and stops conducting. Thus, in situations where a phase lag exists in the current and maximum power is to be delivered to the load, the trigger pulse must be delayed past the voltage zero crossing by an amount equal to the phase lag. The power level control circuit according to this invention generates trigger pulses during each half cycle which begin at the proper phase angle and continue until the next voltage zero crossing.

Another object of the present invention is to provide a trigger pulse generator which supplies properly timed pulses to the trigger gating circuits, which combines pulses from the power level control circuit and the phase angle detector in such a way as to provide a properly timed trigger pulse to one gating circuit during each positive half-cycle and another properly timed pulse to a different gating circuit during each negative half-cycle. Further, all the trigger pulses can be routed to the same gating circuit in the event a (TRIAC) type semiconductor switching device is used.

Another object of the present invention is to provide a trigger circuit which is capable of driving a variety of switching devices. Most prior art systems derive the power for their trigger pulses from the AC line which leads to some undesirable consequences. When the system is started at zero and the power level is slowly increased, the phase lag also starts at zero because the amount of phase lag is not only a function of the inductive reactance but also of the load current. At this point, when the AC line voltage has not built up sufficient voltage to fire the (TRIAC) or (SCR), there is a slight dead band in the control. The trigger circuit employed in this invention, however, provides high voltage compliance, (20 volts), high current, (150 ma), DC pulses of infinitely variable width and incorporates an independent isolated DC power supply which is driven by a high frequency multi-vibrator. The trigger pulses are produced by simply gating the multi-vibrator on and off. The power supply is designed to operate into any impedance including a dead short, without stressing any of the components. The trigger system according to this invention provides enough power in the trigger pulses to drive any commercially available (TRIAC), (SCR), MOSFET), or (DARLINGTON PAIR).

Another object of the present invention is to provide an auxiliary on/off input with a variety of novel features. Thus, it allows the system to be turned on or off remotely by any form of electromechanical, solid-state, or opto-isolated relay as well as any proximity or photo switch. It also may be actuated by the application of any high voltage, (120 VAC), low voltage, (24 VAC), or (TTL level) signals.

Further, the system incorporates an adjustable soft start which begins at zero and ramps the power up to the pre-set level determined by the level control signal whenever the auxiliary on-off is activated. Also included in the auxiliary on-off control are independently adjustable time delays for both the turn-on and turn-off functions.

Another object of the present invention is to provide a method of operating in a half-wave rectified mode. This feature allows the system to be operated only during the positive half-cycles of the AC line voltage, which can be particularly useful when the system is used to drive the coils of vibratory feeder machinery because the abrupt pulsations produced by this mode of operation often establish very energetic resonances in the machinery. This mode of operation is also useful for controlling certain kinds of DC motors.

Another object of the present invention is to provide a remote power level control interface circuit which allows the system to be operated by a variety of external devices, such as computers, programmable controllers, temperature, pressure or level sensors, etc. The circuit is designed to provide remote control of the power level by means of a (0–5VDC), a (0–10VDC), or a (4–20 ma) signal or by means of an external potentiometer. The desired mode of level control is selected by a system of solder bridges. Simply connecting the appropriate solder bridges allows the system to be configured in any mode without changing or modifying circuit components. Under conditions where the remote level control signal must be electrically isolated from the AC neutral an optional analog opto-isolator may be used in conjunction with the remote power level control interface circuit.

These and other objects and advantages of this invention will be more clearly understood from a careful consideration of the drawings and a detailed description of the preferred embodiment.

DESCRIPTION OF THE PREFERRED EMBODIMENT

Figure 1:
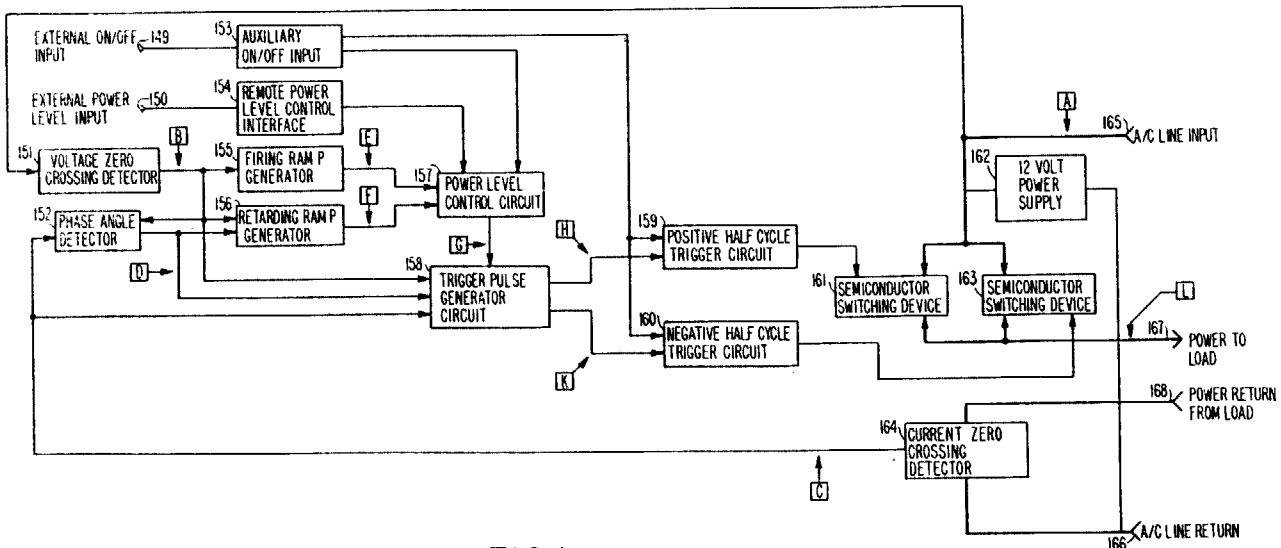
FIG. 1 is a block diagram of the electronic circuit according to the present invention.

A clear understanding of this invention is best achieved by a careful consideration of the block diagram in FIG. 1 and the waveforms illustrated in FIG. 2. The circuit shown in FIG. 1 is designed to be used with a single (TRIAC) and a pair of (SCRs), (MOSFETs), or (DARLINGTON TRANSISTORS), and, of course, the purpose of the invention is to control the amount of AC power delivered to a load by controlling the conduction angle of semiconductor switching devices.

The diagram in FIG. 1 illustrates an application where two semiconductor switching devices are used. One semiconductor controls the conduction during the positive half cycles of the AC line voltage and the other semiconductor controls the conduction during the negative half cycles of the AC line voltage. This represents the most complex embodiment of the invention and is therefore the embodiment which will be described in detail. The letters A through L, which are enclosed in boxes, indicate the locations where the waveforms illustrated in FIG. 2 may be observed. The AC line voltage is applied to connections 165 and 166 while the load is connected between 167 and 168. A 12 volt DC power supply 162 is connected across the AC line input (see FIG. 2A). The power supply provides the energy to operate the active electronics and is referenced to the AC line return 166. The voltage zero crossing detector 151 generates a square wave (see FIG. 2B) which is exactly synchronized with the zero crossing of the AC line voltage. The current zero crossing detector 164 generates a similar square wave (see FIG. 2C) exactly synchronized with the zero crossing of the load current. These square waves are combined in the phase angle detector 152 to produce pulses of fixed amplitude whose duration is exactly equal to the phase lag between the current zero crossing and the voltage zero crossing (see FIG. 2D). The pulse always begins at the voltage zero crossing and terminates with the current zero crossing. The square wave from the voltage zero crossing detector 151 is coupled to the firing ramp generator 155 to produce a repetitive ramp signal which begins at the voltage zero crossing and terminates at the next voltage zero crossing (see FIG. 2E). The square pulses from the phase angle detector 152 are coupled to the retarding ramp generator 156 to produce a truncated ramp signal which begins at each voltage zero crossing, levels off at the conclusion of the phase angle pulse, and is terminated with the next voltage zero crossing (see FIG. 2F).

The power level control circuit 157 is the heart of the entire system. It takes information from the firing ramp generator 155, the retarding ramp generator 156, the auxiliary on/off input 153, and the remote power level control interface 154 to produce trigger pulses (see FIG. 2G) which begin at the proper phase angle, determined by the external power level input 150, and terminate at each voltage zero crossing. The trigger pulse generator circuit 158 uses information from the voltage zero crossing detector 151 to combine the proper pulses from the power level control circuit 157 and the phase angle detector 152 to produce DC trigger pulses (see FIGS. 2H and 2K) which begin at the proper phase angle and terminate at the current zero crossing. It also routes the pulses to the appropriate trigger circuit according to the polarity of the AC line voltage. The positive half cycle trigger circuit 159 and the negative half cycle trigger circuit 160 are gated on by the pulses from the trigger pulse generator circuit 158.

Figure 2A:
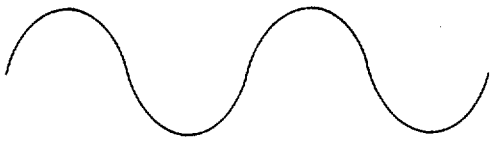
FIG. 2 is a common time scale diagram of the waveforms produced at various points in the circuit of FIG. 1.
Figure 2B:
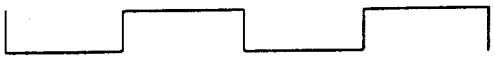
Figure 2C:
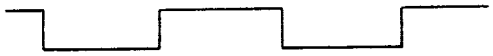
Figure 2D:
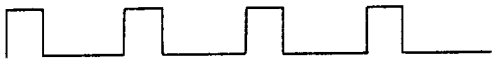
Figure 2E:
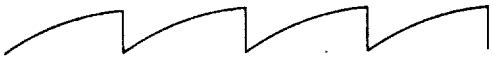
Figure 2F:
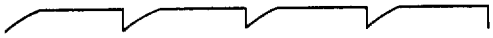
Figure 2G:
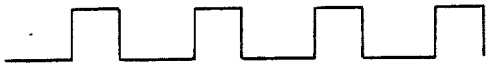
Figure 2H:
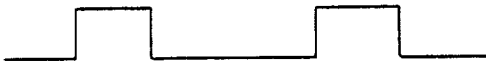
Figure 2K:
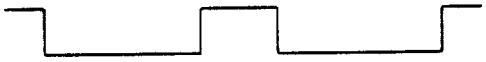
Figure 2L:
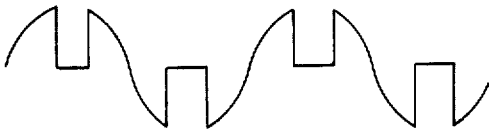

They are also inhibited or enabled according to the signal from the auxiliary on/off input 149, 153. The trigger circuits provide the signals that turn on the semiconductor switching devices and enable them to conduct electrical current. Semiconductor switching device 161 is connected in such a way as to initiate the conduction of current during the positive half cycle of the AC line voltage. The inductive property of the load will tend to continue the conduction of current in the same direction past the voltage zero crossing. Therefore, the semiconductor switching device 161 must be maintained in the conduction mode until the current flowing in that direction actually falls to zero. This of course happens at the current zero crossing. Semiconductor switching device 163 is connected in such a way as to initiate the conduction of current during the negative half cycle of the AC line voltage. The output waveform is shown in FIG. 2L. The retarding ramp generator 156 prevents the semiconductor switching device 163 from being switched into conduction before semiconductor device 161 is turned off and vice-versa, that is, "shoot through" is avoided.

The use of two semiconductor switching devices illustrated in FIG. 1 is optional, of course. Alternatively, a simple solder bridge connection can be provided to establish the routing of the trigger pulses and allow the circuit to be used with a single bi-directional switching device, a (TRIAC), or two switching devices (SCRs), (MOSFETs), or (DARLINGTON PAIR TRANSISTORS). This invention also offers significant advantages in the case where a single (TRIAC) or a pair of (SCRs) is used. Previous designs use the properties of thyristor-type devices which allow them to be trigger pulse switched into conduction and thereafter maintained in conduction so long as the current through them exceeds a certain minimum value. If the inductive reactance of the load is significant a voltage spike is developed when the thyristor turns off as the current through it falls below the minimum value required to keep it in conduction. The inductive property of the load forces the current to continue flowing through the load even though the thyristor is switched off. The amount of current flowing is very small but the impedence of the non-conducting thyristor is very high. This results in a very high voltage spike which can damage sensitive electronic components or even the thyristors themselves. Previously, the energy in these spikes was dissipated by means of clipping devices or snubber networks, and the design of these prior art systems required that they be optimized for the inductive reactance of each particular load. This invention, however, maintains the thyristors in conduction mode until the current through the inductive load actually falls to zero by continuously applying a trigger pulse until the dynamically measured load current truly falls to zero.

It now remains to consider certain functional blocks of the circuit in detail.

Load Current Zero Crossing Detector

Figure 3:
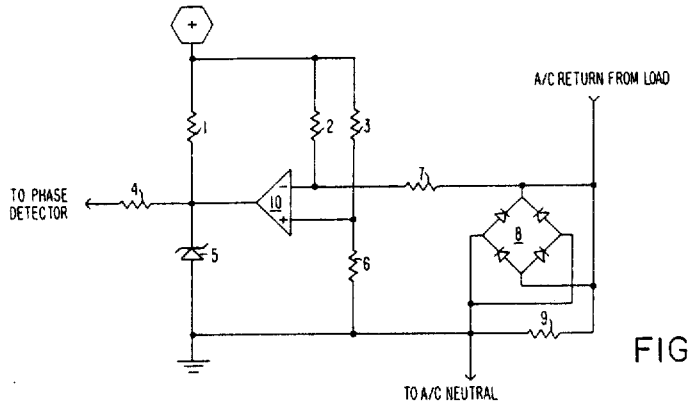
FIG. 3 is a schematic diagram of the load current zero crossing detector.

A schematic diagram of a load current zero crossing detector is shown in FIG. 3. The purpose of the current zero crossing detector is to provide a square wave which is exactly synchronized with the zero crossing of the load current. This may be accomplished in a variety of ways, but the present invention uses a method which has distinct advantages over the prior art. The load current is coupled directly through a high current diode bridge 8 to the AC neutral. The DC outputs are shorted together and the AC outputs are also shorted together to form two sets of cross connected diodes in parallel. A 39K ohm resistor bypasses the semiconductor switching devices to provide the proper zero crossings when the current is near zero, and a 4.7K ohm resistor 9 is connected across the diodes to clean up the signal when the voltage developed across the diodes is less than their forward threshold voltage. This produces a roughly square wave which is connected to the inverting input of voltage compartment 10. The diodes limit the excursion of voltage at the input to the forward threshold voltage of the diodes, regardless of the load current. This design works well without adjustment or modification for all load currents which fall within the rating of the diode bridge. The inputs of the comparator are both biased slightly above ground by the resistive dividers 2, 7, and 3,6. This shifts the comparator switching point to 1.5 volts above ground. The voltage developed across the diodes is added to the 1.5 volt offset at the inverting input of voltage comparator 10. The maximum excursion of the output is limited by the resistor 1 and Zener diode 5. The square wave output is then coupled through resistor 4 to the phase angle detector 152.

Phase Angle Detector

Figure 4:
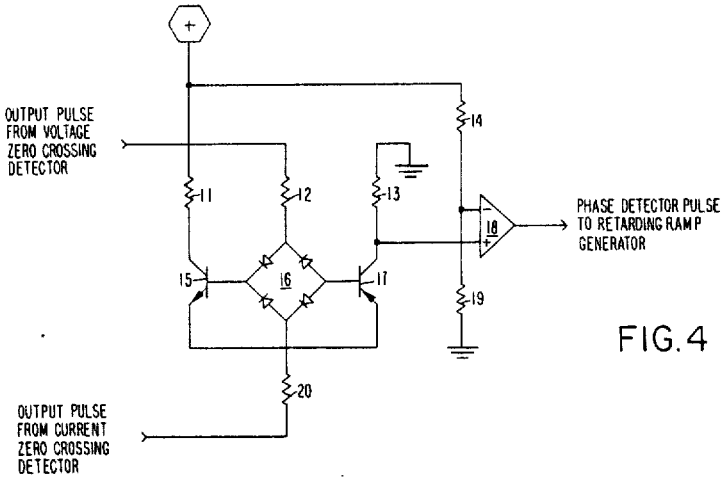
FIGS. 4 and 4a show schematic diagrams of two types of phase angle detectors.
Figure 4A:
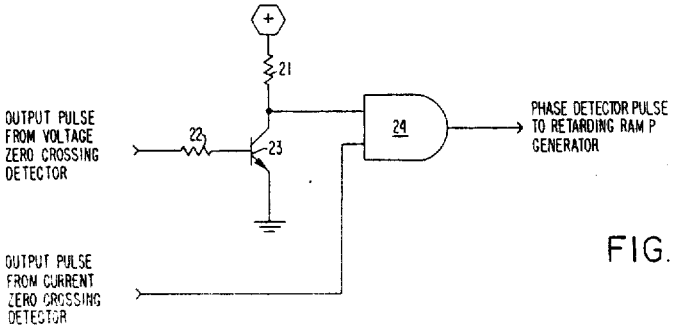

FIGS. 4 and 4a, respectively, show two suitable design for a phase angle detector. The FIG. 4 design incorporates a diode bridge 16 and two transistors 15 and 17 to develop a voltage across resistor 13 whenever the inputs through resistor 12 and 20 are in different states. Resistor 11 shifts the quiescent point of the transistors to a suitable range. Voltage comparator 18 detects the potential on resistor 13 and switches state when it exceeds the voltage at the inverting input developed by the resistive divider 14, 19. The output which is a square pulse is fed to the retarding ramp generator 156. The FIG. 4a design, somewhat simpler, simply inverts the output pulse from the voltage zero crossing detector by means of resistor 22, transistor 23 and resistor 21. The inverted pulse is fed into the input of AND gate 24. The second input of the AND gate is connected to the output pulse from the current zero crossing detector. Both circuits perform the same function. The output is high when the inputs are different, and the output is low when the inputs are the same.

Firing/Retarding Ramp Generator Circuit

Figure 5:
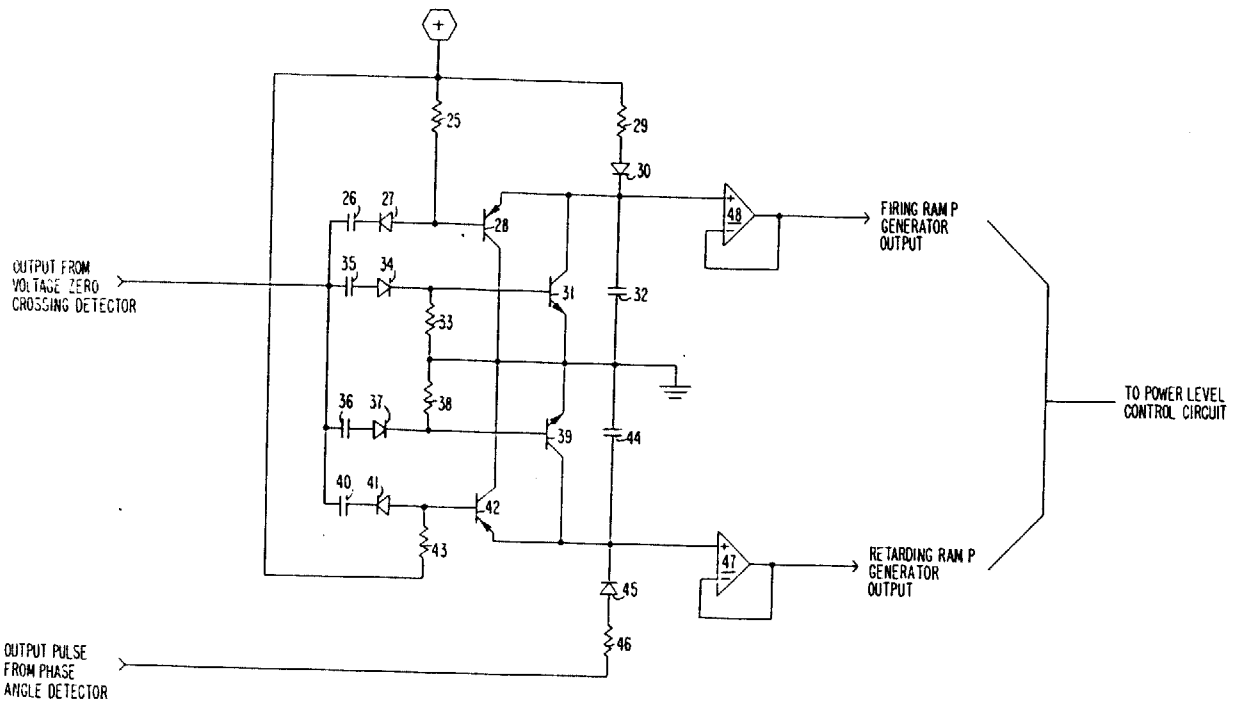
FIG. 5 is a schematic diagram of the firing and retarding rap generator circuit.

The schematic diagram of this circuit is illustrated in FIG. 5. The purpose of this circuit is to provide timing ramps which determine when to initiate the trigger pulses in order to deliver the desired amount of power to the load. Both firing and retarding ramps begin with the voltage zero crossing and end with the next voltage zero crossing. The output from the voltage zero crossing detector is differentiated by the four capacitors 26, 35, 36 and 40. The firing ramp is generated by charging capacitor 32 through diode 30 and resistor 29. When the output of the voltage zero crossing detector switches from low to high state the current through diode 34 and resistor 33 momentarily switches transistor 31 into conduction thereby discharging capacitor 32. When the output of the voltage zero crossing detector switches from the [low] *high* state to the [high] *low* state the current through diode 27 and resistor 25 momentarily switches transistor 28 into conduction, thereby discharging capacitor 32. Op-amp 48, which is configured as a voltage follower monitors the potential on capacitor 32 and transmits it to the power level control circuit.

In a similar fashion transistors 39 and 42 are momentarily switched into conduction by means of currents flowing through resistor 38 and diode 37, and resistor 43 and diode 41, respectively. The primary difference between the retarding ramp generator and the firing ramp generator is the way in which capacitor 44 is charged through diode 45 and resistor 46. Unlike capacitor 32, which is charged directly through the positive output of the power supply, capacitor 44 is only charged during the time when the output from the phase angle detector is high. Diode 45 prevents capacitor 44 from discharging when the output from the phase detector returns to the low state. This results in a retarding ramp which begins at a voltage zero crossing and increases until the load current crosses through zero. Then the retarding ramp voltage levels off until the next voltage zero crossing at which time capacitor 44 is discharged and the ramp is reset to zero. Op-amp 47, which is also configured as a voltage follower, monitors the potential on capacitor 44 and transmits it to the power level control circuit 157.

Power Lever Control Circuit

Figure 6:
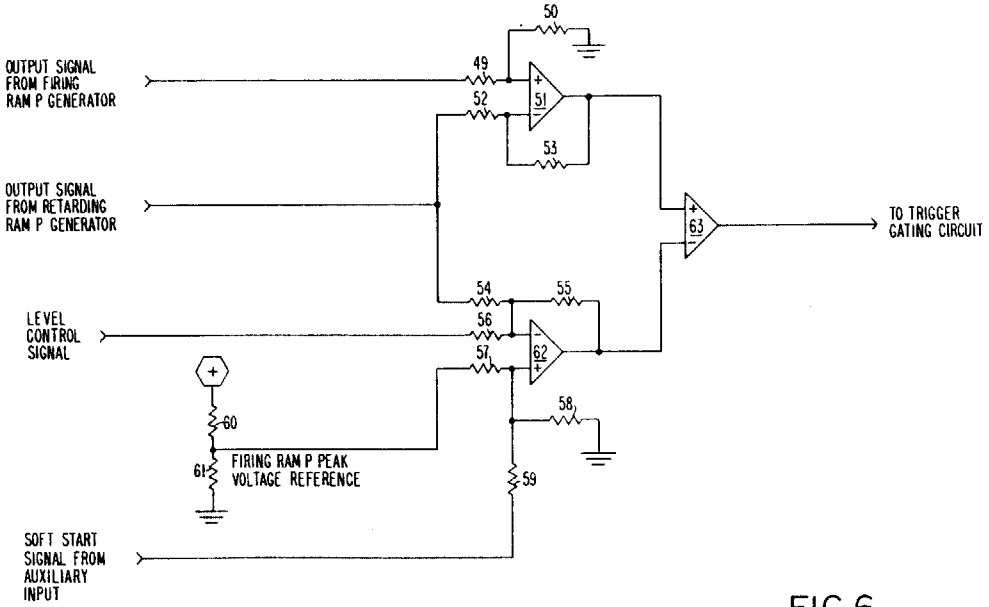
FIG. 6 is a schematic diagram of the power level control circuit.

The purpose of the power level control circuit, shown in FIG. 6, is to provide a trigger pulse every half-cycle which begins at the proper phase angle and terminates at the next voltage zero crossing. The trigger pulses are actually generated by voltage comparator 63. The trigger pulses are initiated when the potential at the noninverting input rises above the potential at the inverting input. Resistive divider 60,61 provides a potential which is exactly equal to the peak voltage of the ramp signals from the firing ramp generator and the retarding ramp generator. Op-amps 51 and 62 are configured as adding, subtracting signal processors. Resistors 49, 50, 52, 53, 54, 55, 56, 57, 58 and 59 all have the same value in order to make op-amps 51 and 62 simple adder/subtractors with unity gain.

The level control signal is subtracted from the firing ramp peak voltage by op-amp 62. Its output is then connected to the inverting input of voltage comparator 63. The retarding ramp generator signal is subtracted from the firing ramp generator signal by op-amp 51, whose output is connected to the noninverting input of voltage comparator 63. The retarding ramp generator signal is also subtracted from the firing ramp peak voltage by op-amp 62. This produces a situation where a trigger pulse is initiated whenever the difference between the firing ramp generator and the retarding ramp generator is greater than the firing ramp peak voltage minus the sum of the level control signal and the retarding ramp voltage. Simply stated this means the retarding ramp signal retards the earliest possible firing angle by an amount equal to the phase lag between the voltage and current in the load. Decreasing the level control signal voltage retards the firing angle while increasing the level control signal voltage advances the firing angle. Therefore, the firing angle may be adjusted by means of the level control signal to any value between the load current zero crossing and the next voltage zero crossing.

Another function of the power level control circuit 157 is to implement the soft start function. When the auxiliary on/off input is actuated, a signal which begins at the power supply voltage and slowly decreases to zero is coupled to the power level control circuit. This signal is added to the firing ramp peak voltage by op-amp 62. The net result is the provision of trigger pulses which are initially retarded until the next voltage zero crossing (non-existent) and slowly advanced until they are finally initiated at the proper firing angle.

Trigger Pulse Generator

Figure 7:
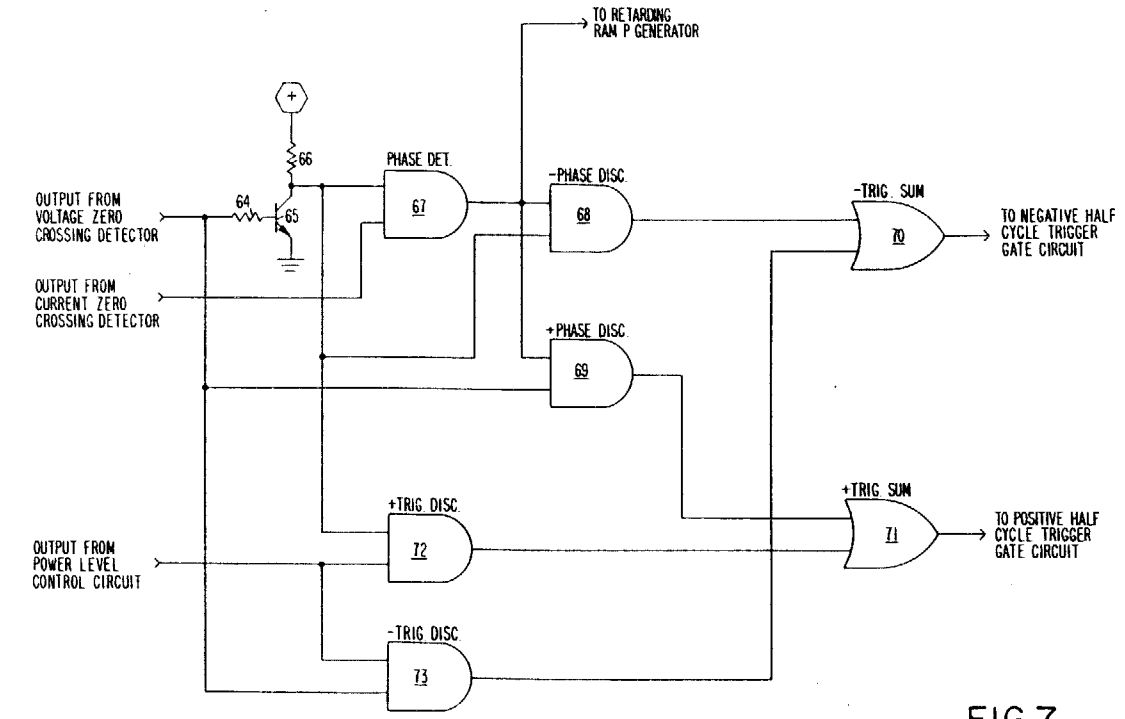
FIG. 7 is a logic diagram of the trigger pulse generator.

It is this circuit which accounts for much of the flexibility of the present invention. It enables the invention to be used with a single (TRIAC) type device or pairs of (SCRs), (MOSFETs) or (DARLINGTON PAIRS). It also eliminates dangerous voltage spikes at the load by maintaining the trigger pulse until the actual load current zero crossing. A logic diagram of the trigger pulse generator is shown in FIG. 7. For the purpose of clarity the phase detector 152 is also included in FIG. 7. The output from the voltage zero crossing detector is inverted by resistors 64 and 66, and transistor 65. This inverter together with AND gate 67 constitutes the phase angle detector.

The AND gates 72 and 73 are used to discriminate between trigger pulses from the power level control circuit which occur during the positive half cycles of the line voltage, and trigger pulses which occur during the negative half cycles of the line voltage. In a similar fashion AND gates 68 and 69 discriminate between the phase angle detector pulses, which occur during the positive half cycles of the line voltage and the ones which occur during the negative cycles. The OR gates 70 and 71 are used to add the trigger pulses from the power level control circuit to the appropriate pulses from the phase angle detector circuit. This produces trigger pulses which begin during the positive half cycles and end during the following negative half cycles as well as trigger pulses which begin during the negative half cycles and end during the following positive cycles. The summing OR gates 70 and 71 also serve to route the trigger pulses to the appropriate trigger circuits.

Trigger Circuit

Figure 8:
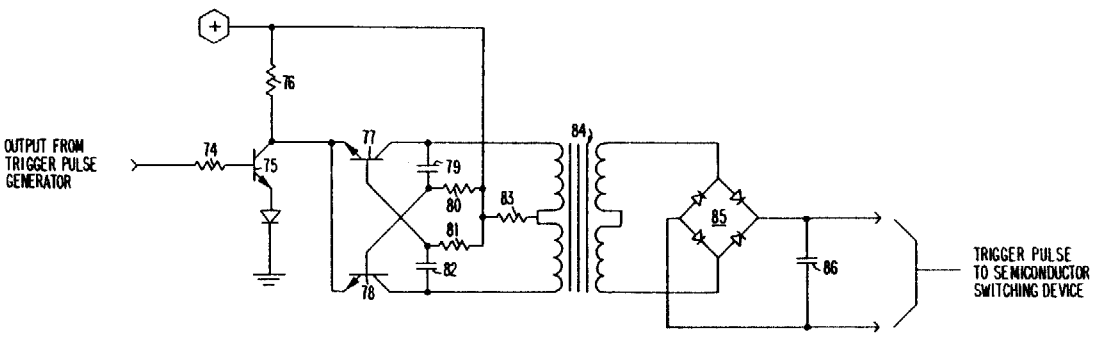
FIG. 8 is a schematic diagram of one of the trigger circuits.

The trigger circuit shown in FIG. 8 provides a continuous DC trigger signal to a semiconductor switching device so long as the gating transistor 75 is maintained in conduction. Positive trigger pulses from the trigger pulse generator switch transistor 75 into the conduction mode through resistor 74. Diode 169 is used to shift the operating point of transistor 75 by an amount equal to the forward threshold voltage of the diode. Resistor 76 provides the bias current necessary to allow transistor 75 to be switched into conduction mode more quickly than possible with the time constant of resistor 83 and the inductance of the primary of transformer 84.

Transistors 77 and 78, capacitors 79 and 82, and resistors 80 and 81 form a high frequency free running multivibrator which is used to drive the primary of transformer 84. Resistor 83 limits the maximum current through transistors 77 and 78 to a safe value. The voltage produced by the secondary winding of transformer 84 is rectified by diode bridge 85 and filtered by capacitor 86 before being coupled to the semiconductor switching device. Transformer 84 provides the necessary high voltage insulation to isolate the electronics from the switching devices and the line voltage. This invention incorporates two trigger circuits in order to allow two semiconductor switching devices to be used.

Auxiliary On/Off Input

Figure 9:
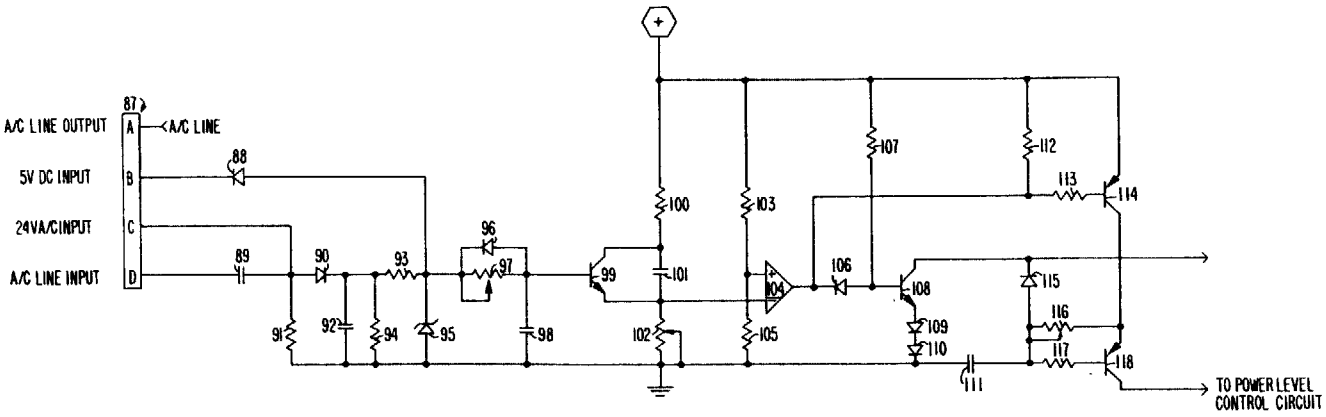
FIG. 9 is a schematic diagram of the auxiliary on/off input circuit.

A schematic diagram of the auxiliary on/off input circuit is shown in FIG. 9. This circuit is designed to accomplish several important functions: it allows the system to be turned on and off remotely by a variety of devices; it incorporates an an adjustable time delay for the turn-on function; it incorporates an adjustable time delay for the turn-off function; and it provides a declining voltage ramp for the soft-start feature. As indicated in FIG. 9 the auxiliary on/off circuit may be activated by a variety of signals via connector 87. In the event that the AC line voltage is used as the input signal the voltage is applied to pin (D) of connector 87. The AC current is limited by capacitor 89 and a voltage is developed across resistor 91. The voltage is rectified by diode 90 and filtered by capacitor 92. Bleed resistor 94 is connected across the capacitor to limit the DC voltage developed. Resistor 93 and zener diode 95 are provided to limit accidental excursions which might damage the electronics.

Variable resistor 97 and capacitor 98 form a time constant for the turn-on delay. Diode 96 assures a rapid discharge of capacitor 98 when the input signal is removed. When the input signal is first applied capacitor 98 charges slowly through resistor 97. When sufficient voltage is developed across capacitor 98 transistor 99 switches into conduction and discharges capacitor 101. The voltage developed across variable resistor 102 suddenly increases to the potential determined by the resistive divider 100, 102. This potential exceeds the voltage developed at the non-inverting input of voltage comparator 104 by resistive divider 103,105. At this point the output of the comparator 104 switches from high to low, turning on transistor 114 via resistor 113. Simultaneously, transistor 108 is turned off via diode 106. At this point capacitor 111 begins to charge through variable resistor 116 and transistor 114. Transistor 118 is switched fully into conduction mode and the full power supply voltage is coupled to the power level control circuit through its collector. As capacitor 111 charges, transistor 118 is slowly turned off, thereby reducing the voltage to the power level control circuit. When capacitor 111 becomes sufficiently charged, transistor 118 is turned completely off by resistor 117 and the voltage delivered to the power level control circuit falls to zero. When the input is removed the charge on capacitor 92 is quickly dissipated through resistor 94.

The charge on capacitor 98 is also quickly dissipated through resistor 94, resistor 93, and diode 96. This of course switches transistor 99 into the non-conducting state. At this time capacitor 101 begins to charge through resistor 100 and variable resistor 102. The potential across variable resistor 102 slowly decreases until it falls below the potential at the non-inverting input of comparator 104. At this point the output of comparator 104 switches back into the high state, turning off transistor 114 and turning on transistor 108. Resistors 107 and 112 maintain transistor 108 in conduction and transistor 114 in the off state respectively whenever the output of voltage comparator 104 is high. Diodes 109 and 110 serve to shift the operating point of transistor 108 by an amount equal to the sum of their threshold voltages. This allows the collector of transistor 108 to effectively gate the trigger circuits on and off, thus providing the desired enable/disable function.

Different input signals are simply coupled to different points in the circuit. For example, a 24 volt AC input signal is coupled via pin C of connector 87 directly to the junction between capacitor 89 and resistor 91. A 5 volt DC input is coupled via pin B of connector 87 through diode 88 to the junction between resistor 93 and zener diode 95. Connector 87 also supplies the AC line voltage on pin A to allow operation by means of a relay type device.

Remote Power Level Control Interface Circuit

Figure 10:
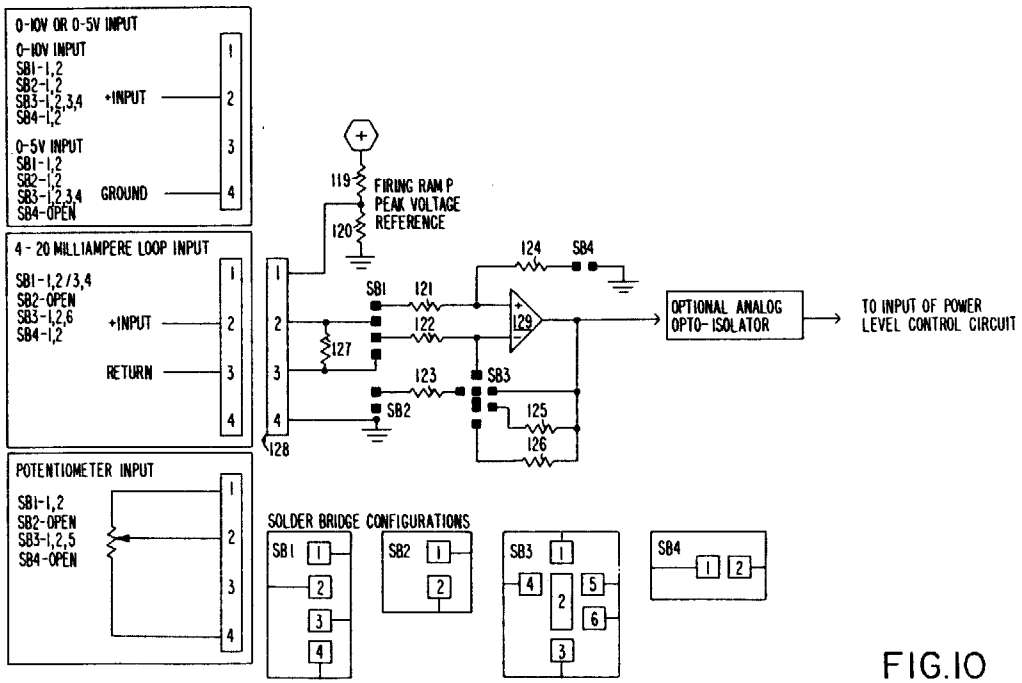
FIG. 10 is a schematic diagram of the remote power level interface circuit, as well as the solder bridge configurations and details of connections required for operating in various modes.

The function of this circuit is to couple a variety of level control input signals to the level control circuit. It is in effect a variable transfer function signal processor which may be discretely switched from mode to mode by means of changing connection in solder bridges. FIG. 10 shows a schematic of the circuit as well as solder bridge configurations and connections for several different kinds of inputs. Illustrations of the solder bridge configurations are contained in the boxes beneath the schematic. Each solder bridge is labeled, for example, SB1, SB2, SB3, etc. Each pad in each solder bridge is numbered. The connections described in the boxes to the left of the schematic indicate which pads must be connected in each solder bridge. For example, SB3-1, 2, 3, 4 indicates that pads 1, 2, 3 and 4 of solder bridge 3 must be connected together, while SB1-1,2,/3,4 indicates that pads 1 and 2 of solder bridge 1 must be joined together and pads 3 and 4 must also be joined together. The "/" indicates that two separate connections must be made on the same solder bridge.

Four separate modes of operation are illustrated in FIG. 10. In the first mode, (0–10 v input), the signal is applied between pins 2 and 4 of connector 128, and op-amp 129 is configured as a non-inverting amplifier. Resistors 121 and 124, of equal value, attenuate the input signal by a factor of two. Resistors 126 and 123 form the feedback network and establish the gain of the amplifier.

In the second mode,(0–5 v), the signals applied to the same pins of connector 128, and op-amp 129 is also configured as a non-inverting amplifier. In this case, however, resistor 121 is connected directly to the amplifier and the input signal is not attenuated. The same resistor network establishes the feedback and gain of the amplifier so that a 5 volt input signal produces the same output signal as the 10 volt input signal in the first mode.

In the third mode the input signal consists of a 4 to 20 ma current loop. In this case the signal is connected between pins 2 and 3 of connector 128 as indicated in the diagram. The current flows through resistor 127 and establishes a voltage difference between pins 2 and 3. Op-amp 129 is configured as an adding-subtractor with unity gain. Resistor 121, 122, 124 and 125 all have the same value. In this mode the amplifier subtracts the voltage at pin 3 from the voltage at pin 2 and transmits the difference to the power level control circuit. The value of resistor 127 is carefully chosen to provide a full range of control.

In the fourth mode the control signal is derived from an external potentiometer. The reference voltage of the potentiometer is established by the resistive divider 119 and 120 and supplied to pin 1 of connector 128. The clockwise terminal of the potentiometer is connected to pin 1, the wiper is connected to pin 2, and the counterclockwise terminal is connected to pin 4. In this mode op-amp 129 is configured as a simple voltage follower and the input is coupled to the amplifier through resistor 21. In circumstances where the remote level input signal must be electrically isolated from the neutral of the AC line an analog opto-isolator may be used between the output of op-amp 129 and the input of the power level control circuit. Under these circumstances it is necessary to supply the power to op-amp 129 with an independent power supply.

The only portions of the circuit of FIG. 1 not heretofore described are the power supply section, the actual switching devices, and the voltage zero crossing detector circuit. They will be briefly described in the interest of completeness but they are not germaine to the present invention.

The power supply conventionally comprises a transformer which steps the line voltage down to 12 VAC and a diode bridge which rectifies it. A suitable capacitor serves as the input filter for a voltage regulator and an additional capacitor can be provided to filter the output.

The switching devices 161 and 163, as previously mentioned, can be represented, for example, by darlington pair assemblies, which are available in a variety of sizes and ratings.

The voltage zero crossing detector conventionally employs an Op-Amp which serves as the zero crossing detector. The AC line voltage is coupled through a suitable resistor to two cross connected diodes, which are connected to ground. This arrangement produces a square wave whose peak amplitude is limited to the forward threshold voltage of the diodes. It is also synchronized to the line voltage. Suitable voltage dividers shift the switching point of the op-amp to 1.5 volts above ground, and a resistor is also provided as a pull-up resistor, together with a zener diode which clips the output to provide a clean square wave output.

Although the present invention has been described in the form of a particular specific embodiment, it will be appreciated by those skilled in the art that various alterations and rearrangements may be made in the design without departing from the spirit and scope of this invention. It is intended that the appended claims be interpreted to cover all such modifications which fall within the spirit and scope of this invention.

What is claimed and desired to be secured by Letters Patent of the United States is:

1. A circuit for controlling the amount of AC power delivered to a load by varying the conduction angle of at least one semiconductor switching means, comprising means for detecting the AC voltage zero crossings, means for detecting the load current zero crossings, means for detecting the phase lag between the voltage and the current in said load, means for producing a firing ramp voltage, means for producing a retarding ramp voltage, means combining said firing ramp voltage and said retarding ramp voltage to produce a first set of trigger pulses for establishing a firing conduction angle of said at least one semiconductor switching means, means responsive to said combining means and said phase lag detecting means for generating a second set of trigger pulses for beginning at said firing conduction angle of said at least one semiconductor switching means and continuing past the voltage zero crossing to the load current zero crossing, and means for discriminating between binary values of said second set of trigger pulses for supplying discriminate trigger pulses to said at least one semiconductor means.

2. A power controller circuit according to claim 1, wherein said at least one semiconductor switching means comprises a TRIAC device.

3. A power controller circuit according to claim 1, wherein said at least one semiconductor switching means comprise a pair of one of the following devices; MOSFET, bi-polar transistor, SCR thyristor, and DARLINGTON transistor.

4. A power controller circuit according to claim 1, further comprising an auxiliary on/off input circuit, including means for turning on said circuit from one of the following power sources: AC line voltage, 24 volts AC, and 5 volts DC, means for supplying a soft start to said controller circuit means for adjustably delaying the operation of said controller circuit for a predetermined time after said auxiliary input circuit is activated, and means for adjustably delaying the discontinuous operation of said controller circuit for a predetermined time period after said auxiliary input is deactivated.

5. A power controller circuit according to claim 1, further comprising a remote power level control interface circuit for controlling the AC power to said load, including means for applying a DC voltage control signal between 0 to 10 volts, means for applying an analog control signal between 0 and 10 volts, a potentiometer means for producing a 0 power level up to a maximum power level control signal with no deadband in between, and means applying a control signal in the form of a 4–20 ma current loop.

6. A power controller circuit according to claim 1, further comprising a means for delivering said sets of trigger pulses to said at least one semiconductor means only during the positive half cycles of the AC line voltage to thereby provide only DC voltage pulses of controlled amplitude load.

7. A power controller circuit accordign to claim 1, wherein said means for detecting load current zero crossing includes a diode bridge circuit comprising two sets of cross connected diodes in parallel, the outputs of said bridge circuit being connected to a comparator, and the output of said comparator being connectd to said phase detector means.

8. A power controller circuit according to claim 1, wherein said means for generating said sets of trigger pulses includes a first gating means for discriminating between said first set of trigger pulses which occur during the positive half cycles of the line voltage and trigger pulses which occur during the negative half cycles of the line voltage, a second gating means for discriminating between negative and positive pulses from said phase lag detector means, and a third gating means for combining the outputs of said first and second gating means and providing said second set of trigger pulses.

9. A method for controlling the amount of AC power delivered to a load by varying the conduction angle of a semiconductor switching means, comprising the steps of measuring a phase angle lag between voltage zero crossover and current zero crossover, producing a firing ramp voltage, producing a retarding ramp voltage, combining said firing ramp voltage and said retarding ramp voltage to produce a first set of trigger pulses for establishing a firing conduction angle of said at least one semiconductor switching means, generating a second set of of trigger pulses in response to said first set of trigger pulses for beginning at said firing conduction angle of said at least one semiconductor switching means and continuing past the voltage zero crossover to the load current zero crossover, and discriminating between binary values of said second set of trigger pulses for supplying discriminate trigger pulses to said semiconductor means.

10. A method for controlling the amount of AC power delivered to a load by varying the conduction angle of a semiconductor switching means, comprising the steps of detecting the AC voltage zero crossings, detecting the load current zero crossings, measuring the phase lag between the voltage and the current in said load, producing a firing ramp voltage, producing a retarding ramp voltage, combining said firing ramp voltage and said retarding ramp voltage to produce a first set of trigger pulses for establishing a firing conduction angle of said at least one semiconductor switching means, generating a second set of trigger pulses in response to said first set of trigger pulses and said phase lag for beginning at said firing conduction angle of said at least one semiconductor switching means and continuing past the voltage zero crossing to the load current zero crossing, and discriminating between binary values of said sets of trigger pulses for supplying discriminate trigger pulses to said semiconductor means.

* * * * *